May 16, 1961
J. T. CRABB
2,984,201
MEANS FOR REMOVING ACCUMULATED WATER
FROM THE INTERIOR OF BOATS
Filed Nov. 23, 1959
2 Sheets-Sheet 1
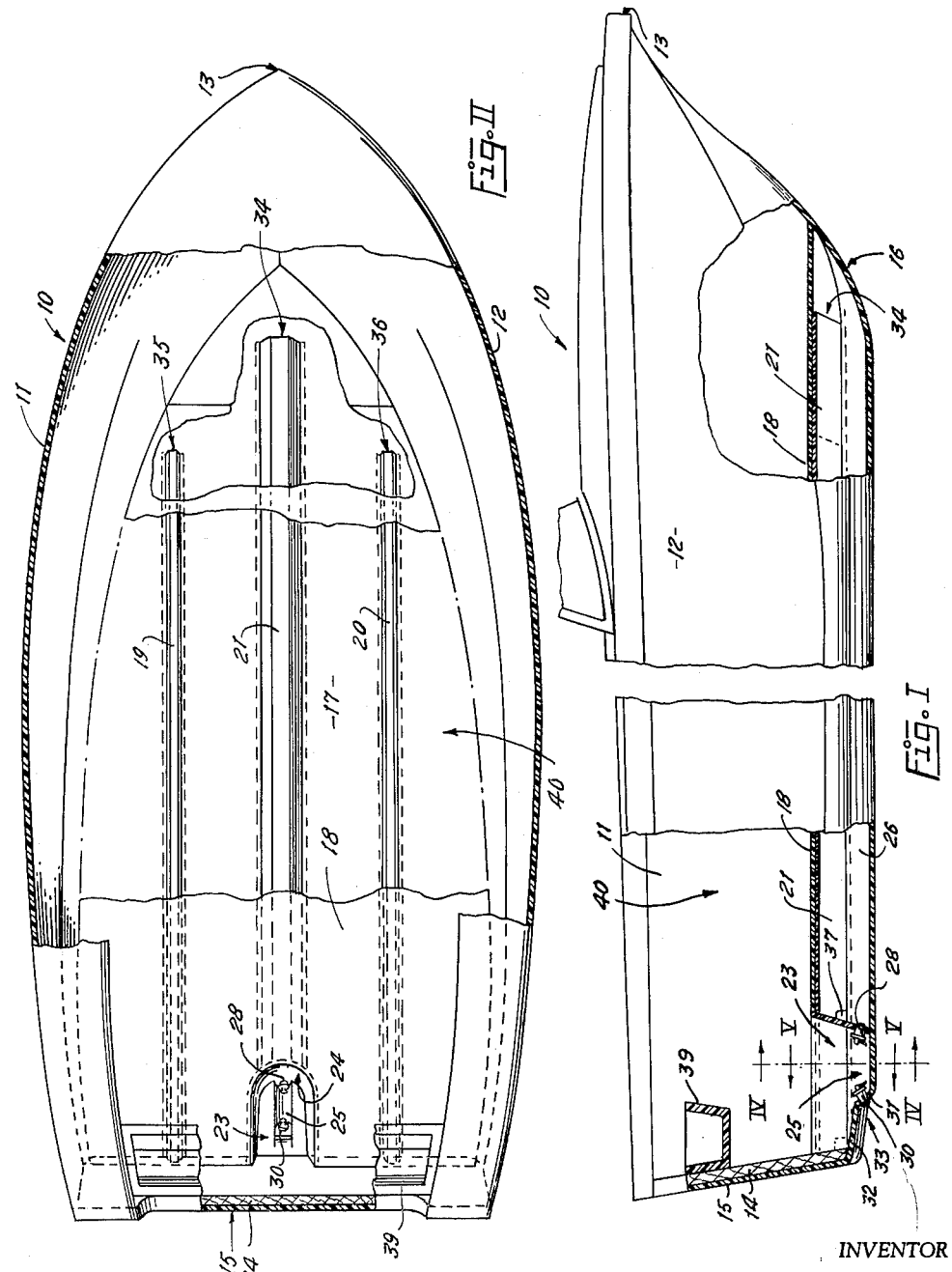
INVENTOR
John T. Crabb
BY *Howard E. Moore*
ATTORNEY

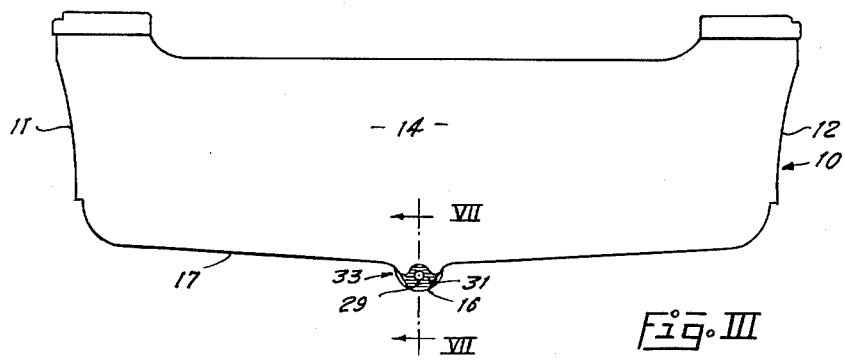
Fig. III
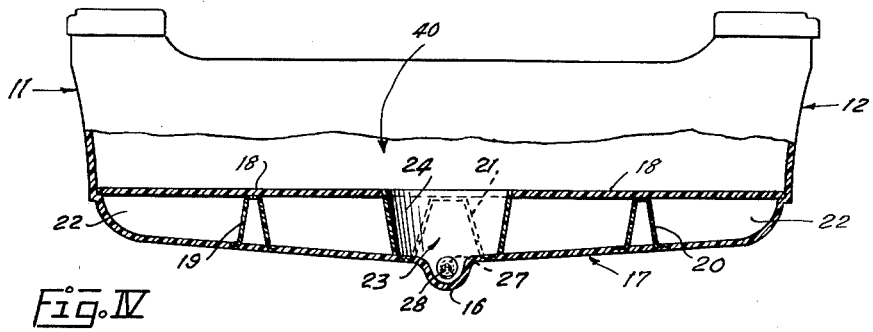
Fig. IV
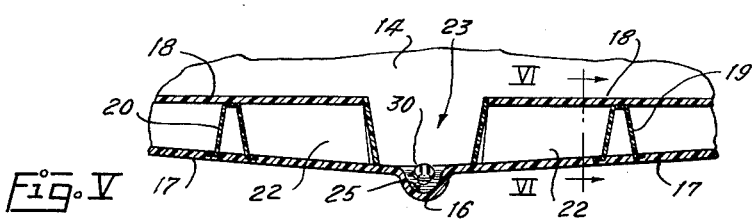
Fig. V
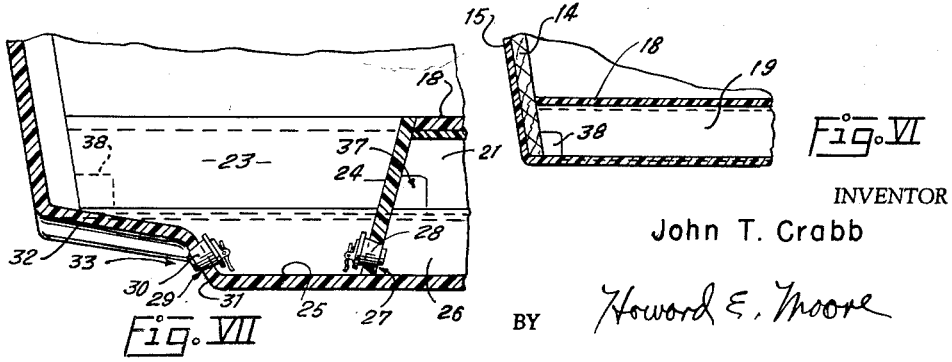
Fig. VII
Fig. VI
INVENTOR
John T. Crabb
BY Howard E. Moore
ATTORNEY United States Patent Office 2,984,201
Patented May 16, 1961

2,984,201
MEANS FOR REMOVING ACCUMULATED WATER FROM THE INTERIOR OF BOATS
John T. Crabb, Grand Prairie, Tex., assignor to Lone Star Boat Company, Plano, Tex., a corporation of Texas
Filed Nov. 23, 1959, Ser. No. 854,848
7 Claims. (Cl. 114—183)

This invention is concerned with boats, and is particularly concerned with an improvement in means for automatically evacuating accumulated water from the passenger compartment of boats and from the enclosed flotation compartment below the floor of the boat.

Pleasure and other boats have heretofore been made having a floor therein which is in spaced relation to the hull bottom of the boat, providing an enclosed air space between the floorboard and the hull bottom, so as to lend greater buoyancy to the boat, resulting in less draught in the water, and providing sufficient buoyancy to prevent the boat from sinking in the event it is capsized. Such watertight compartment is commonly known as the "flotation compartment."

It has been found that water collects in the flotation compartment by condensation, or by seepage through the hull of the boat, or the floorboard, thereby reducing the buoyancy of the boat.

It has been the practice in the past to provide a passage through the floorboard for evacuating water from the flotation compartment, and a pump in the floor, flush with the bottom of the boat, into which water which collects in the passenger compartment can be accumulated, and from which the accumulated water of both the passenger compartment and flotation compartment may be evacuated by suction or gravity.

However, this practice has not been entirely satisfactory, since such procedure leaves some of the accumulated water in the flotation compartment. Moreover it is not convenient to evacuate the accumulated water from the flotation compartment by such means while the boat is in use.

The present invention is intended to provide an automatic means for removing and evacuating water from both the cockpit or passenger compartment and the flotation compartment of the boat by the forward motion of the boat. This is accomplished by providing a lowered sump at the stern of the boat, adjacent the transom wall, the bottom of which sump is coextensive with the trough of the keel, and providing communication between the flotation compartment and the sump, and communication through the rear wall of the sump and the outside of the boat, so that when the boat is in forward motion a pressure differential is created between the inner and outer sides of the boat whereby water which has a tendency to accumulate in the passenger compartment, and in the flotation compartment, will be automatically evacuated from the interior of the boat by suction.

The passage through the wall of the sump, between the sump and the flotation compartment, and the passage through the hull of the boat between the sump and the outer side of the boat, are positioned in alignment with the lowermost trough of the keel so that all accumulated water in both passenger compartment and the flotation compartment is sucked out of the boat.

Other and further objects and advantages of this invention will become apparent upon reading the detailed specification hereinafter following and by referring to the drawings annexed hereto.

A suitable embodiment for carrying out the invention is shown in the attached drawings wherein:

Figure I is a side elevational view of a boat, partially cut away and sectionalized, showing the improvement comprehended by this invention;

Figure II is a top plan view of a boat, partially cut away and sectionalized, showing the improvement;

Figure III is an elevational view of the stern of the boat showing the evacuation passage leading from the sump to the exterior of the boat;

Figure IV is a cross-sectional, elevational view, taken on the line IV—IV of Fig. I, showing the sump and the stoppered passage or hole leading through the wall of the sump to the flotation compartment;

Figure V is a fragmentary sectionalized view taken on the line V—V of Fig. I, showing the passage leading from the sump through the rear wall of the boat;

Figure VI is a cross-sectional view taken on the line VI—VI of Fig. V; and

Figure VII is a cross-sectional view taken on the line VII—VII of Fig. III.

Numeral references are employed to indicate the various parts shown in the drawings, and like numerals indicate like parts throughout the various figures of the drawings.

The numeral 10 indicates generally the boat hull, which includes shaped side walls 11 and 12 which converge to a point at the bow 13. The hull may be made of any desirable material such as metal, wood, or plastic composition. As shown it is made of fiber-glass material.

The side walls 11 and 12 are joined at the stern of the boat by a transom wall 14 which is customarily made of wood or metal and may be covered with fiber-glass material 15.

The bottom 17 of the hull converges downwardly from the sides to provide a keel 16, said keel 16 forming a trough-like portion 26, extending longitudinally and medially of the bottom of the boat.

A floor 18 extends between the walls 11 and 12 and transom 14, inside the hull 10, said floor being spaced from the bottom 17 by, and supported upon, longitudinally extending outboard stringers or braces 19 and 20, and an inboard stringer or brace 21, which constitute spacing, supporting and bracing members for the floor 18.

The space 22 between the bottom 17 and the floor 18 is enclosed and sealed off from the passenger compartment 40, providing an enclosed air space, constituting a flotation compartment for the boat, to add to the buoyancy of the boat, as hereinbefore explained.

A depression, lowered area, or sump 23 is provided below the level of the floor 18 at the stern of the boat adjacent the transom wall 14. The sump 23 is formed and separated from the flotation compartment 22 by a vertical wall 24.

The trough 26, formed by the keel 16, is extended along the lower wall of the sump 23, as indicated at 25.

An inwardly tapered hole 27 is provided through the wall 24 at the lower portion thereof and causes communication between the trough portion 26 of the keel 16, within the flotation compartment 22, and the extension 25 of the trough portion 26, within the sump 23. The hole 27 may be closed by forcing into it a resilient compression-type stopper 28, which may be made of rubber or other resilient material. The stopper 28 may be removed to permit communication between the flotation compartment 22, of which trough 26 is a part, and the sump 23.

An outwardly tapered hole 29 is provided through the upwardly angled wall portion 31 of the bottom of the boat, adjacent the sloping wall portion 32, which merges into the covering material 15 of the transom wall 14. The wall portion 31 is formed by the end of the trough 26. The hole or passage 29 may be closed by a resilient compression type stopper 30, which may be forced therein. The stopper 30 may be removed for the purpose of permitting communication between the sump 23 and the exterior side of the stern of the boat.

It will be understood that other removable closure means may be provided for holes 27 and 29, such as plugs threaded therein.

It will be noted that the angled wall 31 and the sloping wall 32 form a recess 33 rearwardly of the keel 16 for the purpose which will be hereinafter mentioned.

The inboard stringer 21 terminates short of the bow of the boat so as to provide an opening 34 at the front end thereof through which accumulated water in the flotation compartment 23 may pass into the trough portion 26 of the keel 16. The inboard stringer 21 overlies the trough 26 so as to provide an enclosed suction passage through which accumulated water may be drawn to the hole 27.

Ports 37 are provided through the side walls of the inboard stringer 21 adjacent wall 24 of sump 23, as indicated at 37, so that accumulated water which collects rearwardly of the passage 34 may be drawn through such passages 37 into the enclosed space provided by the inboard stringer 21 and therefrom to the hole 27. The front ends of the outboard stringers 19 and 20 are open, as indicated at 35 and 36, providing free access for accumulated water in the flotations compartment 22 which may be sucked through the passage provided interiorly of the stringers 19 and 20, and such water may exit at the aft ends of the stringers 19 and 20 through slots 38 provided in the wall thereof adjacent the transom wall 14.

A splash shield or trough 39 is attached to the inner side of the transom wall at the upper edge thereof so as to receive and collect water which is splashed over the upper edge of the transom wall.

The operation and function of the automatic water evacuating arrangement hereinbefore described is as follows:

Water which accumulates in the passenger compartment 40 of the boat by reason of spray, rain or waves splashed over the side of the boat, will drain into the sump 23; and water which collects in the flotation compartment 22 by condensation or leakage will gravitate to the lowest point, to-wit, the trough 26 formed by the keel 16.

While the boat is in motion through the water, the stoppers 28 and 30 may be removed from the holes 27 and 29, thereby providing communication between the flotation compartment 22 and the sump 23, and between the sump 23 and the exterior of the boat, adjacent the recess 33.

As the boat is in forward motion a pressure differential is created between the exterior of the boat and the interior of the boat, adjacent the hole 29, with the greater pressure being interiorly of the boat. Thereby a partial vacuum is created exteriorly of the hole 29, which causes a suction outwardly of the interior of the boat through the hole 29, thereby sucking and evacuating water from the sump 23 through the hole 29. Such suction also withdraws and evacuates water which accumulates in the flotation compartment 22 through the hole 27 into the sump and from the sump through the hole 29. Since the holes 27 and 29 are in substantial alignment, and are recessed within the trough 26, and extension 25 thereof, formed by keel 16, and since such trough is the lowermost point on the bottom of the boat, substantially all water which accumulates in the flotation compartment 22, in the sump 23 and other areas is automatically evacuated.

The hole 29 is in the upwardly extending wall portion 31 and is substantially isolated from backwardly rushing water which passes over the bottom of the boat as the boat is in motion, so that substantially none of such water can enter the sump 23. The recess 33, provided by the upwardly extending wall portion 31, and the sloping wall portion 32, also provides for a recessed area at the stern of the boat adjacent the hole 29, which increases the vacuum tending to suck water outwardly through the hole 29.

It will thus be seen that I have provided an improvement in boats, which automatically evacuates accumulated water, both from the passenger compartment and from the flotation compartment, by the forward motion of the boat, and the passages through the wall of the sump are so arranged, adjacent the lowermost trough formed by the keel of the boat, and in such aligned position that a substantially unbroken suction is provided between such holes, and in such a way that substantially all accumulated water in the passenger compartment and in the flotation compartment is automatically evacuated by the forward motion of the boat.

It will be understood that other and further forms of my invention may be devised without departing from the spirit and scope of the appended claims.

I claim:

1. In a boat having a hull including side walls, a bottom, a transom wall at the stern and a keel extending longitudinally of the bottom, providing a keel trough extending downwardly of the bottom; a floor in the boat extending between the side walls and the transom, forming a flotation compartment between the bottom and the floor; a sump formed in the floor and extending therebelow to the bottom of the boat adjacent the transom wall; the said trough being extended into the sump, a passage through the wall of the sump providing communication between the sump and the flotation compartment; and a passage through the hull of the boat providing communication between the sump and the outside of the boat.

2. The combination called for in claim 1 wherein the passages are recessed in the trough formed by the keel and are in substantial alignment.

3. The combination called for in claim 1 wherein the passages are provided with removable closure members.

4. In a boat including a hull having side walls, a bottom, and a transom; a floor spaced from the bottom of the boat and extending between the side walls and the transom, providing an enclosed compartment between the bottom of the boat and the floor; a sump extending below the level of the floor and being separated from the flotation compartment by a wall; a passage through the sump wall communicating with the flotation compartment; and a passage through the hull causing communication between the sump and the exterior of the boat.

5. The combination called for in claim 4 wherein the bottom of the boat includes a keel extending longitudinally thereof providing a longitudinal trough; an extension of the trough into the sump; the passages through the wall of the sump and the boat hull being positioned in said trough.

6. The combination called for in claim 5 with the addition of an inboard stringer extending over and along the trough and joined with the sump wall, said stringer being open at its forward end, and having slots through the wall thereof adjacent the sump wall.

7. The combination called for in claim 5 wherein the sump includes an angularly disposed vertical wall portion of the hull at the rear side thereof, and the passage leading from the sump to the exterior of the boat extends through such angularly disposed vertical wall portion.

References Cited in the file of this patent

UNITED STATES PATENTS

| | | |
|---|---|---|
| 233,748 | Good | Oct. 26, 1880 |
| 364,277 | Moore | June 7, 1887 |